United States Patent [19]
He

[11] Patent Number: 5,912,995
[45] Date of Patent: Jun. 15, 1999

[54] METHOD AND APPARATUS FOR ROTATING OR TRANSPOSING A BINARY IMAGE

[75] Inventor: Liang He, Sunnyvale, Calif.

[73] Assignee: Sun Microsystems, Inc., Palo Alto, Calif.

[21] Appl. No.: 08/659,725

[22] Filed: Jun. 6, 1996

[51] Int. Cl.[6] .............................. G06K 9/32; G09G 5/34
[52] U.S. Cl. ........................ 382/297; 382/296; 345/126
[58] Field of Search .................................. 382/297, 296, 382/276; 345/126; 395/137

[56] References Cited

U.S. PATENT DOCUMENTS

| | | | |
|---|---|---|---|
| 4,168,488 | 9/1979 | Evans | 382/297 |
| 4,271,476 | 6/1981 | Lofspiech | 382/297 |
| 4,627,020 | 12/1986 | Anderson et al. | 382/297 |
| 4,837,845 | 6/1989 | Pruett et al. | 345/126 |
| 5,111,192 | 5/1992 | Kadakia et al. | 345/126 |
| 5,598,181 | 1/1997 | Kermisch | 382/297 |
| 5,670,982 | 9/1997 | Zhao | 345/126 |

*Primary Examiner*—David K. Moore
*Assistant Examiner*—Wenpeng Chen
*Attorney, Agent, or Firm*—Townsend and Townsend and Crew LLP

[57] ABSTRACT

A method which may be implemented in a library routine for performing an image transformation. First, a plurality of groups of bits are selected, with each group being from a different row and the rows being aligned in the same column in an image. Next, a logical operation is performed to set to zero all of the bits in the group except for the designated position of the column to be transformed. Finally, each of the groups or rows are compared to a template, and a single bit indicating the result of such comparison is stored in a result register.

20 Claims, 3 Drawing Sheets

METHOD AND APPARATUS FOR ROTATING OR TRANSPOSING A BINARY IMAGE

BACKGROUND OF THE INVENTION

The present invention relates to image processing, and in particular transforming binary images by ±90 degrees rotation or by transposing of the X-Y axis.

In image processing, images are represented by pixels which can be displayed on a screen, paper or otherwise. If the pixels are in color or in a gray scale, multiple bits are needed to represent the color or gray scale of each image. For certain applications, however, a single bit can represent a pixel. For example, black and white images can be represented with a zero bit for black and a one bit for white. Alternately, even for color or gray scale, a single bit could be used to activate the ink, with a one indicating ink and a zero indicating no ink, or vice versa.

It is often necessary to transform an image. For example, an image might be rotated either plus or minus 90°, or the X and Y axes could be transposed. This would be useful, for instance, in changing the orientation of an image on a screen to a desired orientation as is printed out on paper.

FIGS. 1A and 1B illustrate a positive 90° rotation of an image. As can be seen, an image 10 in FIG. 1A is rotated 90° to the position shown in FIG. 1B. The image extends to a position w on the X-axis and h on the Y-axis. Looking at this on a pixel basis, a particular pixel 12 in the output image of FIG. 1B is at a location i on the X-axis and j on the Y-axis. In FIG. 1A, the same pixel in the input image, prior to the rotation, is at a position i on the Y-axis and h-j on the X-axis. Mathematically, the transformation for the three cases of interest is as follows:

Flip X-Y Axes: img_out(i,j)=img_in(j,i)

Rotate +90°: img_out(i,j)=img_in(h-j,i)

Rotate -90°: img_out(i,j)=img_in(j,w-i)

where img_out(i,j) is pixel (i,j) of the output image, img_in(p,q) is pixel (p,q) of the input image, h is the height of the input image, and w is the width of the input image.

FIG. 2 illustrates the difficulties with doing this transformation. Typically, image data is arranged in rows, with multiple pixels, each represented by a single bit, stored in bytes or words in a register or at a memory location. For example, a byte 14 consists of 8 bits in a row, representing 8 pixels at the bottom, lower left corner of the image. A vertical column of pixels 16 would consist of the first bit in each of 8 different bytes or words 0–7. The bits in the columns must be selected and transformed into a number of bits in a row to accomplish transformation. For example, for a positive 90° rotation, bits 0–7 of column 16 are rotated to the position of row 18 in a transformed image 20 from an original image 22. Similarly, for a negative 90° rotation, column 16 assumes the position of row 24 in transformed image 20, with the order of the bits being reversed from that of row 18 along the X-axis, as shown. For a transposing of the X-Y axes, column 16 will assume the position shown as row 26 in transformed image 20.

The difficulty with such a process is that data is typically manipulated in byte or word form, and moving around a single bit requires a large number of steps. In addition, the bytes or words are organized by rows, not columns. When handling a large image, with a large number of pixels to be transformed, doing such a transformation can be very tedious and take a significant amount of processing time.

Special purpose graphics boards have been developed with instructions and specialized hardware for doing certain pixel manipulations. In addition, some general purpose microprocessors have recently included graphical execution capabilities, and support a number of graphical instructions. For example, the UltraSPARC™ microprocessor of Sun Microsystems, Inc., supports a Visual Instruction Set (VIS) for doing certain graphical manipulations. It would be desirable to have a library routine for performing rotation and X-Y transposing transformations using such graphical instructions in a manner which would minimize processing time.

SUMMARY OF THE INVENTION

The present invention provides a method which may be implemented in a library routine for performing an image transformation. First, a plurality of groups of bits are selected, with each group being from a different row and the rows being aligned in the same column in an image. Next, a logical operation is performed to set to zero all of the bits in the group except for the designated position of the column to be transformed. Finally, each of the groups or rows are compared to a first template, and a single bit indicating the result of such comparison is stored in a result register.

To improve the speed of the operation, multiple groups or rows of pixels in the same column are packed into a single register. This can be done with an instruction which allows placement of a byte or word at an offset position within the register.

Subsequently, the multiple rows can be ANDed with a second template (which could be the same template) to select the desired bit corresponding to a column of interest in each group or row. The second template would include a 1 bit at the desired position in each group, and zeros elsewhere.

Next, a compare instruction can be used to compare the multiple groups to the first template, preferably all zeros. The result of this comparison will be a one if there is a one in the desired position, indicating that it is greater than the first template. Otherwise, a zero is returned, regenerating the original bit in a particular column at each row.

Using an instruction which generates a single bit for each group compared can produce a mask as a result, with at least 4 bits for four comparisons in parallel. Such an instruction is available, for example, in the Sun Microsystem's VIS instruction set, and was originally designed for doing comparison operations for purposes such as determining which pixel is in front of another in the Z buffer.

For a fuller understanding of the nature and advantages of the invention, reference should be made to the following description taken in conjunction with the accompanying drawings.

DETAILED DESCRIPTION OF THE PREFERRED EMBODIMENTS

Figure 1A:
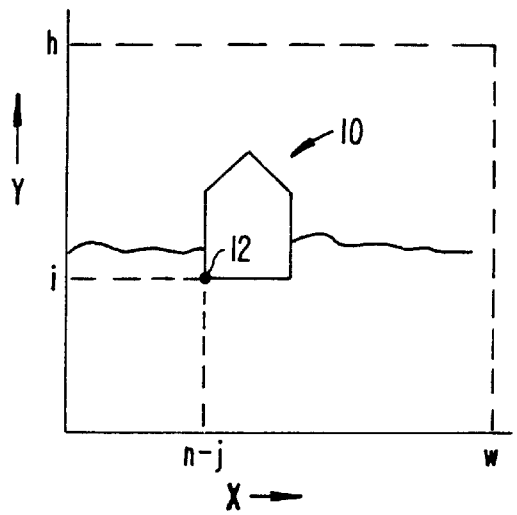
FIGS. 1A and 1B are diagrams illustrating the rotation of an image.
Figure 1B:
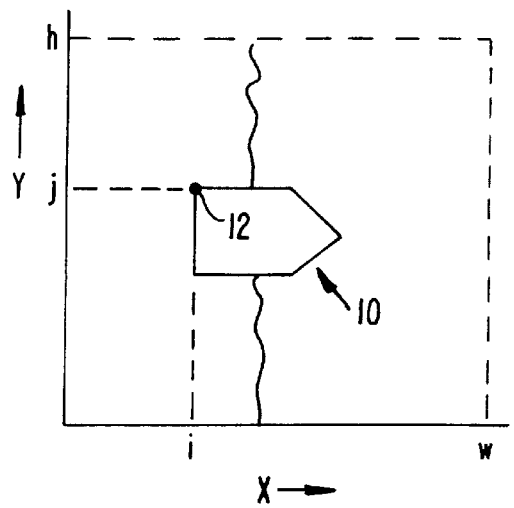
Figure 2:
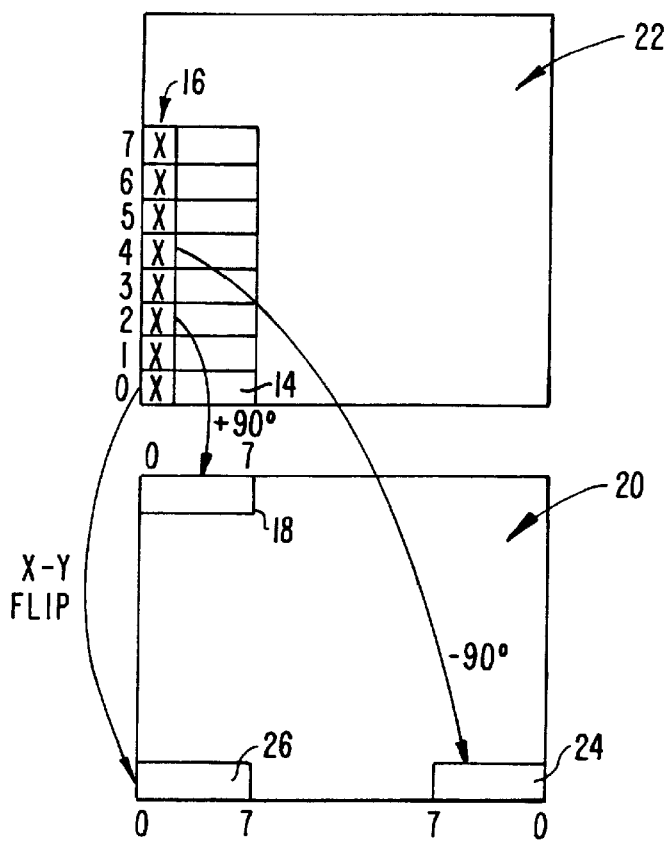
FIG. 2 is a diagram illustrating the position of a column in a rotated or transposed image.
Figure 3:
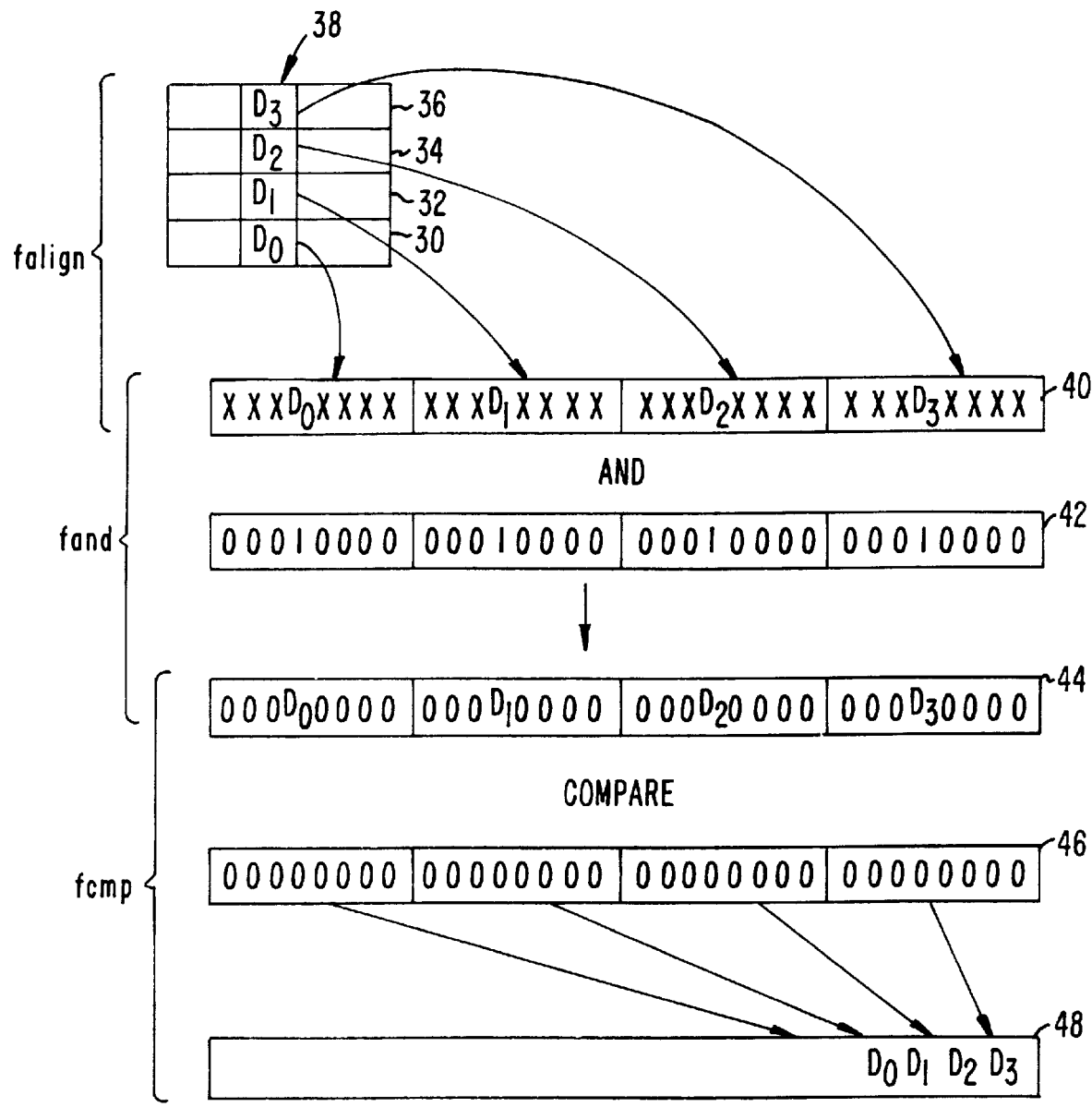
FIG. 3 is a diagram illustrating the steps of a transformation according to the present invention.

FIG. 3 is an illustration of the steps according to one embodiment of the present invention for doing a transformation. In the example used, four bytes 30, 32, 34 and 36 are shown, each corresponding to a separate row of the image. For the example shown, a designated column 38 will be processed, containing four bits, D0, D1, D2 and D3 corresponding to the four rows.

In a first step, each of the bytes are taken from their original location in a register or memory and are packed together in a single register 40 as indicated by the arrows shown. In the example shown, the column bits, D0–D3, are located at the fourth bit position in each byte. This operation can be performed, for example, by using the falign instruction in the UltraSPARC™ VIS instruction set, described in more detail below. Alternately, other instructions from other languages could be used.

Basically, the falign instruction allows data to be moved with an offset to a new register. By choosing an offset of zero for the first byte 30, it ends up being in the first position shown. By using an offset of one byte for the second byte 32, it will end up in the second position, etc.

In the next step, a logical operation is used to set all of the bits to zero except for the designated column bits, D0–D3. This can be done, for example, by using a template such as template 42. This template has all zeros except for a 1 bit at the fourth position in each byte, corresponding to D0–D3. By ANDing the two registers together, 40 and 42, the result will be provided to a register 44 with all zeros at positions except for D0–D3. If D0, for instance, is a one, by ANDing it with a 1, a 1 is generated in register 44. Alternately, if D0 is a zero, ANDing it with 1 will produce a zero in register 44. A series of templates can be stored and used, with ones at each of the different positions in each byte for use with the particular column being processed. One embodiment of an instruction for performing the step is the fAND instruction of the VIS instruction set, which allows the ANDing of multiple pixels in parallel without overflow into the next position in a register where the pixels are packed into the same register.

In the next step, a compare operation can be done with a second template shown in a register 46. Alternately, the same template from register 42 could be used. The comparison operation compares the value of the template for each byte with the value of the byte in register 44. If the value of the byte in register 44 is greater, a 1 will be stored to the corresponding one of four positions in a mask register 48. If the value in the byte in register 44 is less than or equal to that of the template in 46, a zero will be stored to the bit position 48. Thus, as can be seen, if the value of any one of D0–D3 in any particular byte is 1, it will be greater than a template of all zeros, and correspondingly a 1 will be stored at the appropriate position in register 48. Alternately, if a zero is the value of any one of D0–D3, a zero will be stored in the corresponding position in register 44. If the same template from register 42 is used, a comparison for equality will produce the same result. Thus, this operation provides a method for pulling out a particular bit from each byte and packing them together in register 48.

The compare operation can be accomplished using the fcmp instruction in the VIS instruction set, for example. This instruction was originally designed for operations such as comparing multiple groups of pixels in parallel and determining which is in front of the other in the Z buffer for determining which to display on a screen. The resultant mask can be used to gate which pixels get displayed out of any particular row. The present invention uniquely utilizes this instruction to pick out the bits corresponding to a particular column and repack them as a row in contiguous positions. The fcmp instruction is described in more detail below.

VIS_falign

Vis_faligndata ( ) takes two vis_d64 arguments data_hi and data_lo. It concatenates these two 64 bit values as data_hi, which is the upper half of the concatenated value, and data_lo, which is the lower half of the concatenated value. Bytes in this value are numbered from most significant to the least significant with the most significant byte being 0. The return value is a vis_d64 variable representing eight bytes extracted from the concatenated value with the most significant byte specified by the GSR register offset field.

VIS_fcmp

Vis_fcmp[gt, le, eq, neq, lt, ge] ( ) compare four 16 bit partitioned or two 32 bit partitioned fixed-point values within data1_4_16, data1_2_32 and data2_4_16, data2_2_32. The 4 bit or 2 bit comparison results are returned in the corresponding least significant bits of a 32 bit value, that is typically used as a mask. A single bit is returned for each partitioned compare and in both cases bit zero is the least significant bit of the compare result.

For vis_fcmpeq ( ), each bit within the 4 bit or 2-bit compare result is set if the corresponding value of [data1_4_16, data1_2_32] is equal to the corresponding value of [data2_4_16, data2_2_32].

Figure 4:
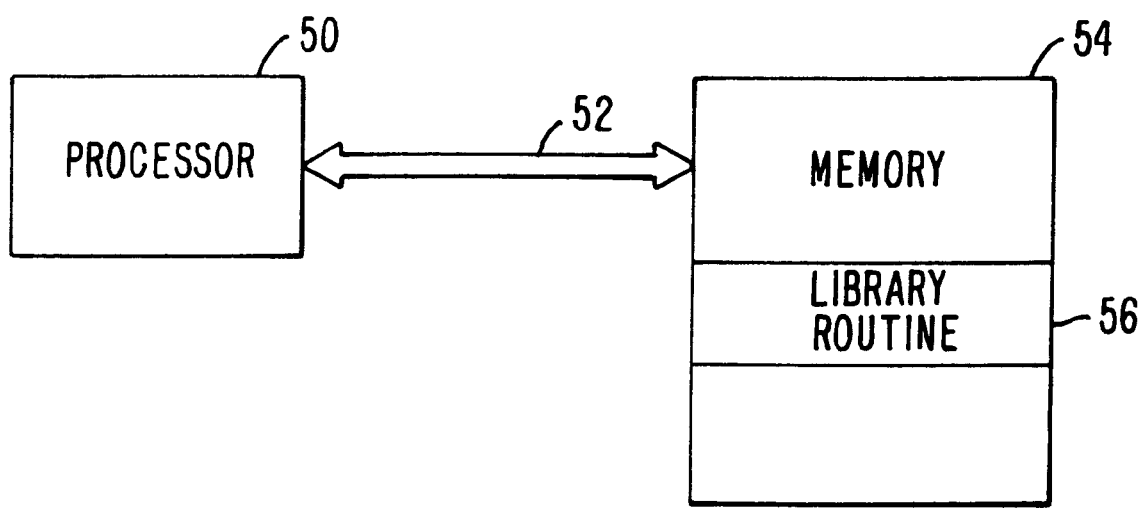
FIG. 4 is a block diagram of a computer system according to the present invention.

FIG. 4 shows a computer system with a processor 50 coupled to a memory 54 via a bus 52. Memory 54 includes a library routine 56 according to the present invention.

Set forth below is a source code listing using VIS instructions for a positive 90° rotation, negative 90° rotation and an X-Y transposition showing an example of library routines which can be created for these three functions.

As will be understood by those with skill in the art, the present invention may be embodied in other specific forms without departing from the spirit or essential characteristics thereof. Accordingly, the foregoing description of the preferred embodiments is intended to be illustrative, but not limiting, of the scope of the invention which is set forth in the following claims.

What is claimed is:

1. In a computer system, a method comprising the steps of:

providing an image;

selecting a plurality of groups of bits representing pixels, each group being from a different row of said image, each group having pixels in the same column;

performing a logical operation to set to zero all bits of each group except a bit at a designated position;

comparing each group to a template, and storing a bit, indicating a result of said comparing, in a bit position in a result group corresponding to a position of said group in said column; and displaying a transformed image with pixels represented by said result group.

2. The method of claim 1 further comprising the steps of repeating said steps for each bit in said group of bits, and for each group in said image.

3. The method of claim 1 wherein said selecting step further comprises storing said plurality of groups of bits into a single register in an order corresponding to an order of said groups in said column.

4. The method of claim 1 wherein said logical operation is an AND operation of said group of bits with a template having all zeros except for a bit corresponding to a position of said designated position.

5. The method of claim 1 wherein said comparing step compares a plurality of groups of bits in a single register with a template having a value at said designated position which will cause a result of said comparing step to reproduce said bit at said designated position in said groups.

6. The method of claim 1 wherein:

said selecting step uses an align data instruction for placing a group at a desired location in a register;

said logical operation uses an AND instruction which simultaneously ANDs a plurality of groups in parallel; and said comparing step utilizes a compare instruction which compares a plurality of groups in parallel and stores a single bit result of each comparison in a mask register.

7. The method of claim 1 wherein said transformation is one of a +90 degree rotation, a −90 degree rotation, and an X-Y axis transposition.

8. In a computer system, a method comprising the steps of:

providing an image;

selecting a plurality of groups of bits representing pixels, each group being from a different row of said image, each group having pixels in the same column;

storing said plurality of groups of bits into a single register in an order corresponding to an order of said groups in said column;

performing an AND operation of said group of bits with a first template having all zeros except for a bit corresponding to a position of said designated position in each group;

comparing each group to a second template, and storing a bit, indicating a result of said comparing, in a bit position in a result group corresponding to a position of said group in said column, said second template having a value at said designated position which will cause a result of said comparing step to reproduce said bit at said designated position in said groups;

repeating said steps for each bit in said group of bits, and for each group in said image; and displaying a transformed image with pixels represented by said result group.

9. A memory storing a library routine for execution by a program on a processor to transform an image, said library routine comprising instructions for:

selecting a plurality of groups of bits representing pixels, each group being from a different row of said image, each group having pixels in the same column;

performing a logical operation to set to zero all bits of each group except a bit at a designated position; and comparing each group to a template, and storing a bit, indicating a result of said comparing, in a bit position in a result group corresponding to a position of said group in said column.

10. The memory of claim 9 further comprising an instruction for repeating said steps for each bit in said group of bits, and for each group in said image.

11. The memory of claim 9 further comprising an instruction for storing said plurality of groups of bits into a single register in an order corresponding to an order of said groups in said column.

12. The memory of claim 9 wherein said logical operation is an AND operation of said group of bits with a template having all zeros except for a bit corresponding to a position of said designated position.

13. The memory of claim 9 wherein said comparing instruction compares a plurality of groups of bits in a single register with a template having a value at said designated position which will cause a result of said comparing instruction to reproduce said bit at said designated position in said groups.

14. The memory of claim 9 wherein:

said selecting instruction uses an align data instruction for placing a group at a desired location in a register;

said logical operation uses an AND instruction which simultaneously ANDs a plurality of groups in parallel; and said comparing instruction utilizes a compare instruction which compares a plurality of groups in parallel and stores a single bit result of each comparison in a mask register.

15. A computer system comprising:

a processor;

a bus coupled to said processor;

a memory coupled to said bus, said memory storing a library routine for execution by a program on a processor to transform an image, said library routine comprising instructions for selecting a plurality of groups of bits representing pixels, each group being from a different row of said image, each group having pixels in the same column;

performing a logical operation to set to zero all bits of each group except a bit at a designated position; and comparing each group to a template, and storing a bit, indicating a result of said comparing, in a bit position in a result group corresponding to a position of said group in said column.

16. The system of claim 15 wherein said library routine further comprises an instruction for repeating said steps for each bit in said group of bits, and for each group in said image.

17. The system of claim 15 wherein said library routine further comprises an instruction for storing said plurality of groups of bits into a single register in an order corresponding to an order of said groups in said column.

18. The system of claim 15 wherein said logical operation is an AND operation of said group of bits with a template having all zeros except for a bit corresponding to a position of said designated position.

19. The system of claim 15 wherein said comparing instruction compares a plurality of groups of bits in a single register with a template having a value at said designated position which will cause a result of said comparing instruction to reproduce said bit at said designated position in said groups.

20. The system of claim 15 wherein:

said selecting instruction uses an align data instruction for placing a group at a desired location in a register;

said logical operation uses an AND instruction which simultaneously ANDs a plurality of groups in said comparing instruction utilizes a compare instruction which compares a plurality of groups in parallel and stores a single bit result of each comparison in a mask register.

* * * * *

UNITED STATES PATENT AND TRADEMARK OFFICE
CERTIFICATE OF CORRECTION

PATENT NO. : 5,912,995
DATED : June 15, 1999
INVENTOR(S) : Liang He

It is certified that error appears in the above-identified patent and that said Letters Patent is hereby corrected as shown below:

Column 6, line 58, delete "groups in" and replace with --groups; and --.

Signed and Sealed this

Twenty-ninth Day of February, 2000

Attest:

Q. TODD DICKINSON

*Attesting Officer*      *Commissioner of Patents and Trademarks*